Figure 2:
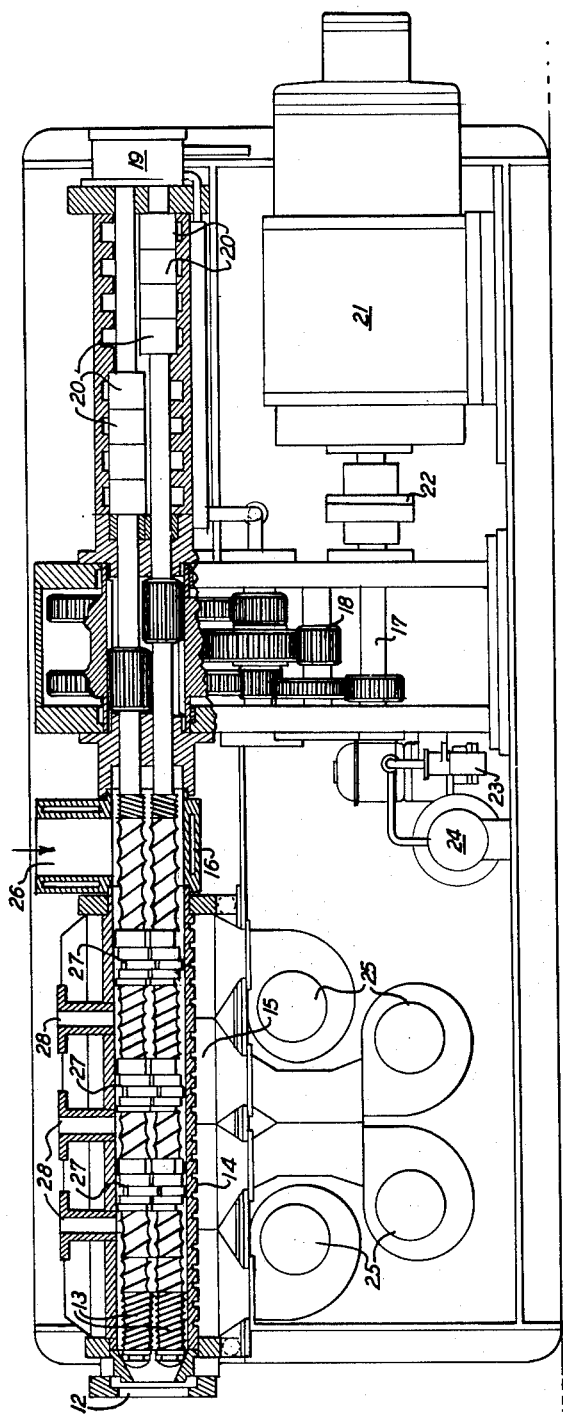

Sept. 1, 1964   W. STEINLE ETAL   3,146,493
PROCESS AND APPARATUS FOR THE PRODUCTION
OF POLYOLEFINE GRANULATES
Filed July 25, 1960   2 Sheets-Sheet 1

INVENTORS
WALTHER STEINLE
ALFRED SCHIWY
KARL SCHMITT
BY
*Burgess Dicklage Sprung*
ATTORNEYS Sept. 1, 1964  W. STEINLE ETAL  3,146,493
PROCESS AND APPARATUS FOR THE PRODUCTION
OF POLYOLEFINE GRANULATES
Filed July 25, 1960  2 Sheets-Sheet 2

INVENTORS
WALTHER STEINLE
ALFRED SCHIWY
KARL SCHMITT
BY
ATTORNEYS

United States Patent Office 3,146,493
Patented Sept. 1, 1964

3,146,493
PROCESS AND APPARATUS FOR THE PRODUCTION OF POLYOLEFINE GRANULATES
Walther Steinle, Wanne-Eickel, and Alfred Schiwy and Karl Schmitt, Herne, Germany, assignors to Bergwerksgesellschaft Hibernia Aktiengesellschaft, Herne, Germany, a German corporation
Filed July 25, 1960, Ser. No. 45,128
2 Claims. (Cl. 18—12)

The present invention relates to a process and apparatus for the production of polyolefine granulates, and more particularly to the production of granulates of high pressure polyethylene at moderately elevated temperatures and pressures.

After polyethylene has been formed, the polymerizate is desirably converted into a granulate for further work-up in accordance with conventional techniques. The granulate should be as far as possible of a uniform particle size for more convenient handling and processing. In the case of high pressure polyethylene, however, where the product is granulated immediately after polymer production, certain difficulties arise insofar as the so granulated product does not achieve the quality required for further unobjectionable work-up. If high pressure polyethylene is conventionally treated, for example, in accordance with the injection molding technique, treated on calenders or in accordance with the known air blowing methods, and the like, the objects obtained exhibit a tendency to form cracks. Furthermore, where foils or films are produced, nodule formation, haziness, turbidity and other blemishes occur which render the finished product unattractive and undesirable commercially.

In order to avoid these disadvantages, the quality of the polyethylene produced must be improved as, for example, is carried out by well known homogenization methods. The homogenization may take place in various ways such as, for example, in a manner that the polyethylene is forced through a narrow opening at temperatures which are either above or below the melting point of the polyethylene. If this temperature lies below the melting point of the polyethylene, it is desirably maintained approximately within the temperature range between the flow point and the melting point. Moreover, the material under the application of sufficient heat may be continuously conducted through several pairs of cooperating rollers positioned along a path of travel, or the polyethylene may be intensively treated as, for example, by subjecting the same under the application of cooling in a Banbury mixer. The granulating of the polyethylene may thereafter be carried out in the known manner.

One process has gained significance in practical applications where it is sought to improve the quality of the polyethylene. In accordance with this technique, the polyethylene is maintained in a fused mass and passed through a band nozzle in order to impart to the mass the shape of a band or ribbon. The continuous ribbon or band emanating from the nozzle is cooled and thereafter comminuted to small particle form. Subsequently, the granulate so produced may be homogenized in a refiner wherein if desired the polyethylene may be admixed with stabilizers or other agents desired or required. The resulting mixture is then granulated in a suitable device as, for example, an extruder. If the product is to contain dyes, then the granulate must be once more mixed with the dyestuff and granulated in a further step. Apart from the fact that a sufficient improvement in the qualities of the material is not necessarily obtained, such processes suffer from the disadvantage that they entail a certain degree of cumbersomeness. In any case, an immediate granulation of the polymer product, without undergoing any intermediate homogenization step was heretofore operationally impractical, since it was always considered that the product obtained would be unsuitable for subsequent work-up.

Additionally, processes are also known in which thermoplastic materials in powder form may be immediately converted into a suitable granulate in one operation. In this connection the material is subjected to a plasticizer step to form a gel or melt, and subsequently the material is forced through a granulating chamber. The granulator generally consists of a perforated cylinder having a conical cooling jacket and a rotating inner member provided with suitable ribs along its extent which is received within the perforated cylinder. The inner member is spaced from the outer part a distance just sufficient to allow rotational movement so as to force the material to be granulated through the cylinder perforations outwardly of the inner member. Such granulating devices have been used commercially, especially in the case of granulating polyvinyl chloride. Nevertheless, these devices have been considered unsuitable for treating high pressure polyethylene in view of the particular properties of this polyethylene, as noted above.

It is an object of the present invention to overcome the foregoing drawbacks as to provide a process and apparatus for the production of granulates of high pressure polyolefine in a simple and convenient manner.

Other and further objects of the invention will become apparent from the within specification and accompanying drawings, in which:

FIG. 1 is a diagrammatic view of an apparatus for carrying out the production of granulates in accordance with the invention;

FIG. 2 is a schematic sectional view of a granulating apparatus, including worm kneader elements, for the production of granulates in accordance with the invention, and FIGS. 3a, 3b and 3c show schematic sectional views of a pair of coacting kneader elements within a housing of the apparatus shown in FIG. 2, illustrating the manner in which the polyolefine material is kneaded and intimately admixed during the rotation of the kneader elements.

It has been found in accordance with the present invention that granulates of excellent processing properties may be obtained from high pressure polyolefine and, in particular, high pressure polyethylene by conducting the high pressure polyolefine at a temperature of from about 150° to 190° C. and at a pressure up to 10 atmospheres through at least one opening and comminuting the polyolefine upon emergence from said opening. It has been discovered that the above results are achieved in a convenient manner if the temperature is maintained within said range and an excess pressure up to about 10 atmospheres, preferably from 1 to 10 atmospheres, is also maintained. The product is suitably conveyed in constant quantity during the granulation in one operation under the stated conditions. It is most desirable if the high pressure polyolefine material is intensively intermixed prior to emergence from the opening. This may be carried out by passing the material in melt from along a path to the opening and conveying back a portion of the melt along said path prior to emergence from the opening, and subsequently granulating by comminution and the like, in accordance with known techniques.

Specifically, it will be appreciated that due to the properties of high pressure polyolefine materials, such as polyethylene, the rate at which the polyethylene is conducted through the opening will vary with the particular temperature and pressure employed in accordance with the process of the invention. Thus, at the higher portion of the temperature range, the melt will flow more easily so that a lower pressure may be used while at the lower portion of the temperature range the melt will flow more slowly so that a higher pressure may be advantageously used. Nevertheless, a high temperature and pressure and a low temperature and pressure within the above stated ranges may be simultaneously maintained in accordance with the invention with good results.

The high pressure polyolefine material is generally maintained in a reservoir whose pressure is regulated. The material is conveyed in melt form from said reservoir, in a constant quantity preferably, to a granulating device such as a worm granulator. The granulating device may also contain in addition to the conveying and pressing zones, a homogenization zone in which the material is partially conveyed back along its course. In general, in about the first quarter of the worm path within the granulating device, the intake of the material is effected while within approximately the second and third quarters the homogenization is carried out with a partial return of the material being homogenized back along the path a certain distance. In the last quarter of the worm path, the material is conveyed and compressed so that it may be suitably forced through the nozzle and thereafter comminuted.

In this way homogenization within the device is simultaneously carried out with the conveying of the melt to the granulation nozzle. Such homogenization may be conveniently effected in accordance with the known techniques whereby a suitable interval between the surrounding cylinder wall and the rotating worm disposed therewithin is maintained, this interval being larger than normally required, with the consequence that a strong and efficient counter-mixing effect occurs due to the forcing back of the material along the path. In lieu of this arrangement, there may be provided baffle elements or worm members rotating in the opposite direction to that of the main worm and additionally, axially displaceable along the path of travel of the material.

It is particularly advantageous in accordance with the invention to provide the worm shaft of the granulating device along the portion thereof disposed within the homogenization zone with one or more sets of coacting kneading discs. Such discs may assume the approximate form of an equilateral triangle such that the discs of each set may rotate on a corresponding shaft in adjacent sliding relation so as to promote, with respect to the material, a particularly intensive mixing and partial returning effect along the course of the worm path.

The strong mixing effect thus obtained in the homogenization zone is conveniently completely sufficient to attain the desired improvement in the qualities of the high pressure polyolefine material. This may be traced to the fact that high pressure polyolefine material and especially high pressure polyethylene is particularly easily mixable under the specifically applied conditions of temperature and pressure whereby an excellent homogenization may be carried out in spite of the relatively short period of treatment.

The addition of known stabilizers in accordance with the conventional techniques may be effected in accordance with the present invention. The particular quantities required in each case will vary in the known manner and these quantities are added in suitable dosages at some point along the path of travel of the melt. Generally, the addition of any stabilizing agent is made with respect to the conveyor direction of the rotating worm shortly ahead of the introduction of the polyolefine melt in the granulating device.

The polyolefine material is maintained in the form of a melt within the granulating device and at the end of its path is increasingly compressed and forced through a nozzle opening and comminuted in the conventional manner, such as by means of a wet cutting device, so as to form the granulate.

Advantageously, in accordance with the present invention a finished product capable of desirable further processing is obtained in one transit through the granulating device. Furthermore, the high pressure polyolefine may be converted immediately from the form in which it is recovered as a result of polymerization. Foils, films and the like which are produced from the material granulated in accordance with the invention exhibit no haziness, turbidity, surface blemishes or the like. These articles, moreover, show excellent tensile strength and high resistance to tearing.

Referring to the accompanying drawing (FIG. 1), high pressure polyethylene coming from the polymerization process accumulates in the form of a fused mass or melt in a pressure release chamber (not shown) at about 250 atmospheres excess pressure. In this chamber the gaseous ethylene coming over with the liquid polyethylene product is separated by conveniently releasing the pressure. Upon releasing the excess pressure, the liquid polyethylene is passed to storage container 1 having a size of about 2 cubic meters. The polyethylene melt is maintained in container 1 at a temperature of about 150° C. and at an adjustable counter-pressure. Container 1 is provided with heating means 1a so that the polyethylene melt may be maintained within the temperature range of from about 150° to 190° C. Of course, the pressure within container 1 may be maintained within the range between normal pressure and about 10 atmospheres pressure with the aid of the residual gas liberated in the pressure release container (not shown).

By adjusting the pressure passing to storage container 1 as well as the pressure maintained in container 1, the outflow to the granulating device and the output capacity of said device may be regulated in terms of a constant quantity or rate of throughput.

As aforesaid, the inflow quantity passing to the granulating device may be maintained not only by regulating the pressure but also by adjusting the temperature of the high pressure polyethylene melt in container 1. Thus, higher temperatures render the polyethylene material more liquid so that the same flows more quickly through the device at a given pressure while lower temperatures have the opposite effect. The polyethylene melt passes through line 2 from container 1 into the granulator 7. A stabilizing agent maintained in the dosage vessel 3 passes through line 4, the dosage worm 5 and the line 6 to the granulator 7, entering the same at a point slightly upstream of the point of introduction of the polyethylene with respect to the direction of the path of movement of the polyethylene through the granulator. Granulator 7 is of the conventional design, including one or several rotatable worms spaced from and surrounded by an enclosing cylinder means through which the melt is passed during granulating operations. The polyethylene product emerges in continuous form through the end plate and is comminuted to granulate form (8), for example, by means of a rotating knife disposed in a suitable liquid bath such as water. This conventional granulating operation may be carried out in accordance with the teaching set forth in German Patent No. 1,037,116, Belgian Patent No. 506,991, and U.S. Patent No. 2,614,290. The granulate particles pass through sieve 9, container 10 where the particles are freed from moisture, and cell-wheel-sluice 11. If it is desired to add a dye to the polyethylene product, this may be carried out in a further granulation operation wherein the above process is once more repeated with the addition of the dyestuff.

With respect to FIG. 2, a double worm granulating device is shown having a head opening 12 and a pair of cooperating spiral shafts 13 carring the worm sets which are designed to increasingly constrict and compress the material along the worm path and especially immediately before the same emerges from the head opening 12. The intermediate portions of the shafts 13 are provided with approximately triangular kneading discs 27 at three separate points. The shafts 13 are mounted for rotation within the worm housing 14 which is provided along its extent with vacuum suction and cylinder heat exchange means 15 as well as air ventilators 25. The material to be granulated enters opening 26 in inlet means 16 so as to pass along the spiral path, and upon homogenization and compression, the same is finally conducted through head opening 12. Conveniently, provision may be made in the apparatus for the addition of stabilizing agents and dyes at a point along the worm path which lies before the inlet point of the material to be granulated.

The shafts 13 are suitably driven by means of motor 21 connected by couple 22 with drive shaft 17 which transmits the motor power through reduction transmission 18 to the shafts. The opposite ends of the shafts are provided with shaft bearing surfaces 20 and with cooling means 19 which serve to permit the efficient operation of the spiral shafts 13. The motor is suitably provided with water cooling at 24 and pressure circulation lubrication means 23. It will be appreciated that by reason of the three separate groups of kneading disc sets, the material may be advantageously conducted in a spiral path and upon reaching each group of discs, the intensely intermixed material is partially conducted back along the course prior to emergence from head opening 12.

The treatment of the material in each set of coacting discs is readily seen from FIGS 3a, 3b and 3c. Disc 27a is received within housing portion 14a while disc 27b is received within housing portion 14b. The material M is shown being squeezed from housing 14b into housing 14a by reason of the rotational movement of disc 27b in the direction of the arrow and particularly because of the sliding engagement between apex 27b'' and the surrounding wall of housing portion 14b. Simultaneously with the rotational movement of disc 27b, disc 27a cooperating therewith rotates in the same direction whereby the material passes into housing portion 14a on the trailing side of apex 27a''. Thus, the material is confined between the side of disc 27b, determined by the apex 27b'' and the apex 27b', and the adjacent wall of housing portion 14b, and such material is forced into the adjacent space defined by the wall of housing portion 14a and that part of disc 27a which trails apex 27a''. As seen from FIGS. 3a, 3b and 3c, as the volume containing the material in housing portion 14b decreases from a maximum to zero, the pertinent volume of housing portion 14a increases correspondingly from zero to a maximum so that the major portion of the material will be transferred from housing portion 14b to housing portion 14a.

In this way during each rotation of the worm shaft, an exchange of material from one housing portion to the other takes place three times. Nevertheless, the material does not pass in toto from engagement with one kneading disc to the coacting kneading disc, but rather a portion of the material passes axially forwardly and rearwardly with respect to the worm path passing into the adjacent space within housing portion 14a and housing portion 14b, there to be further worked by correspondingly adjacent further coacting kneading discs. Accordingly, an intensive counter-mixing effect is achieved such that while the material eventually emerges from head opening 12, a portion of the material is continuously carried back along the spiral path.

The high pressure polyolefines which may be used in accordance with the present invention include high pressure polyethylenes conventionally produced, such as those wherein pressure of from about 1200 to 2000 atmospheres, for example, are used. More broadly speaking, any high pressure polyolefine may be used in accordance with the invention, including those which possess branched carbon chains, especially those having a molecular weight of from about 10,000 to 30,000 and a melting point of from about 110 to 115° C.

*Example 1*

In the storage container 1 of the arrangement shown in the drawing, 520 kg. per hour of high pressure polyethylene of the commercial type Lupolene H having a molecular weight of 20,000, are passed in melt form by the application of a mantle-heated pipe of 150 mm. inside diameter. Container 1 is likewise mantle-heated and has a content of 57 liters. The contents were maintained under a nitrogen pressure which could be adjusted. The temperature in the container was maintained at 170° C. while the pressure was held at 1.5 atmospheres. From the dosage vessel 3 5 kg. per hour of a mixture of 1 part of finely ground high presure polyethylene (Lupolene H, molecular weight 20,000) having a grain size of 0.2 mm. and 1 part of dilaurylthiodipropionate (as stabilizer) were passed via line 4 through dosage worm 5 and line 6 to the granulator 7 such that the stabilizer mixture passes into the granulator 7 a short distance before the point of addition of the polyethylene via line 2. The granulator 7 was provided with two worm shafts (of the type shown in FIG. 2) having a diameter of 83 mm. The effective length of the worm measured from the forward edge of the inlet opening to the tip of the worm shaft was 700 mm.; the worm shafts were driven by a 40 horsepower motor and the speed of the worm shafts could be adjusted from about 25 to 100 r.p.m. The homogenization of the polyethylene material took place in the intermediate portion of the spiral path and the intensively intermixed material was forced from the granulator through a nozzle plate having a plurality of openings therein. The temperature at the nozzle plate was maintained at about 200 to 205° C. The openings in the nozzle plate were such that the material emerging had a cylindrical shape and a thickness of about 3 mm. The nozzle plate could be replaced by other nozzle plates with different size openings such that a larger or smaller granulate thickness could be attained. In practice the granulate thickness is desirably from 1 to 5 mm.

By means of a cruciform rotating knige disposed in a suitable aqueous bath (8), the emerging strands of material were cut into granulate particles of the desired size. The granulate particles were separated from the aqueous bath by means of the sieve 9 and were freed from moisture in the container 10 and recovered by means of cell-wheel-sluice 11. The coacting spiral shafts were operated at a speed of 60 revolutions per minute and the temperature in the granulator was maintained at 170° C., except in the vicinity of the nozzle plate wherein the temperature was maintained at 200 to 205° C.

*Example 2*

The procedure of Example 1 was repeated, except that the worm shafts were operated at 90 revolutions per minute. The throughput was constantly maintained at 520 kg. per hour under the same temperature and pressure conditions as set forth in Example 1. Instead of the stabilizer used in Example 1, however, 0.2 kg. per hour of the commercial dyestuff Sicoplast-blue in admixture with 3.8 kg. of finely ground Lupolene H from dosage vessel 3 was used. The granulate obtained exhibited a very uniform blue coloring. From this granulate foils of 0.5 to 1 mm. layer thickness were pressed which exhibited a completely uniform blue coloring.

*Example 3*

The procedure of Example 1 was repeated with a throughput of 500 kg. per hour of the polyethylene. In order to produce a colored granulate, a mixture consisting of 10 kg. of the commercial dyestuff Titanium-white and 10 kg. of finely divided high pressure polyethylene (Lupolene H) was added to granulator 7 per hour via dosage vessel 3. The conditions for the granulation were the same as those in Example 1. A very uniformly colored white granulate was obtained which could be processed into any desired object. Microscopic examination showed that the dyestuff was very uniformly distributed throughout the polyethylene material.

*Example 4*

The procedure of Example 3 is repeated using 10 kg. of lamp black instead of Titanium-white. In the same way a very uniform distribution of the dyestuff was exhibited.

While the foregoing specification and accompanying drawing have been set forth for the purpose of illustration, it will be obvious to those skilled in the art that various modifications and changes may be made without departing from the spirit and scope of the invention which is to be limited only by the scope of the appended claims.

What is claimed is:

1. An apparatus for the production of granulates of high pressure polyethylene which comprises means defining a granulating flow conduit having a first inlet for receiving material capable of flowing in melt form, a second inlet for receiving an additive agent to be mixed with said material and at least one outlet opening, means for passing said material capable of flowing in melt form along said conduit to said outlet, and means for comminuting the material upon emergence from said outlet, said means for passing said material in melt form along said conduit including a pair of rotatable worm means, each worm means being fixedly provided along an intermediate portion thereof with at least two adjacent kneading discs of substantially polygonal shape yet with each polygonal face between adjacent apexes having an arcuate configuration, the two discs of each worm means having their apexes peripherally offset with respect to one another, the discs of one of the worm means being axially adjacent and in sliding abutting cooperation with the corresponding discs of the other worm means along a constantly changing peripheral portion thereof during rotation thereof together with the corresponding worm means and each disc being in sliding abutment with the adjacent portion of said conduit thereat.

2. An apparatus according to claim 1 wherein a hopper chamber is flow connected with said inlet for said material, said chamber being sealed and having means for heating the contents therewithin under excess pressure, said discs being substantially triangular in shape yet with each triangular face between adjacent apexes having an arcuate configuration.

References Cited in the file of this patent

UNITED STATES PATENTS

| | | |
|---|---|---|
| 2,319,859 | Hale | May 25, 1943 |
| 2,584,225 | Plunquian et al. | Feb. 5, 1952 |
| 2,862,243 | Farr et al. | Dec. 3, 1958 |
| 2,918,701 | Hull et al. | Dec. 29, 1959 |
| 2,944,047 | Schutze et al. | July 5, 1960 |
| 2,994,105 | Seal et al. | Aug. 1, 1961 |
| 3,070,836 | De Haven et al. | Jan. 1, 1963 |